United States Patent
Duleba

(10) Patent No.: US 11,720,403 B2
(45) Date of Patent: Aug. 8, 2023

(54) SYSTEM FOR COMMITMENT-AWARE WORKLOAD SCHEDULING BASED ON ANTICIPATED RESOURCE CONSUMPTION LEVELS

(71) Applicant: Google LLC, Mountain View, CA (US)

(72) Inventor: Krzysztof Duleba, Seattle, WA (US)

(73) Assignee: Google LLC, Mountain View, CA (US)

( * ) Notice: Subject to any disclaimer, the term of this patent is extended or adjusted under 35 U.S.C. 154(b) by 137 days.

(21) Appl. No.: 16/710,249

(22) Filed: Dec. 11, 2019

(65) Prior Publication Data

US 2020/0341798 A1    Oct. 29, 2020

Related U.S. Application Data

(60) Provisional application No. 62/837,755, filed on Apr. 24, 2019.

(51) Int. Cl.
*G06F 9/50* (2006.01)
*G06F 9/455* (2018.01)
(Continued)

(52) U.S. Cl.
CPC ........ *G06F 9/5027* (2013.01); *G06F 9/45558* (2013.01); *G06F 9/4881* (2013.01);
(Continued)

(58) Field of Classification Search
CPC ............... G06F 9/45558; G06F 9/4881; G06F 9/5038; G06F 9/5077; G06F 9/5083;
(Continued)

(56) References Cited

U.S. PATENT DOCUMENTS

| | | |
|---|---|---|
| 7,809,988 B1 * | 10/2010 | Portal ................ G06F 11/3688 714/38.13 |
| 8,966,493 B1 | 2/2015 | Richards et al. |
| 9,705,820 B2 | 7/2017 | Madduri et al. |
| 10,496,426 B1 * | 12/2019 | Mysore Nagendra Swamy .......... G06F 9/45533 |

(Continued)

FOREIGN PATENT DOCUMENTS

| | | | |
|---|---|---|---|
| CN | 105138391 A | * | 12/2015 |
| CN | 107527171 A | * | 12/2017 |
| KR | 20170011350 A | | 2/2017 |

OTHER PUBLICATIONS

Shen et al. CN105138391A Description Translation, Dec. 9, 2015, [database online], [retrieved on Dec. 9, 2021] Retrieved from Espacenet using Internet <URL:https://worldwide.espacenet.com/publicationDetails/description?CC=CN&NR=105138391 A&KC=A&FT=D&ND=3&date=20151209&DB=&locale=en_EP>, pp. 1-10 (Year: 2015).*

(Continued)

*Primary Examiner* — Meng Ai T An
*Assistant Examiner* — Hsing Chun Lin
(74) *Attorney, Agent, or Firm* — Lerner David LLP

(57) ABSTRACT

A system including a distributed network of one or more virtual machines, having a first portion of committed virtual machines dedicated to a user and a second portion of on-demand virtual machines. The system may also include a workload scheduler configured to receive workloads associated with the user. The scheduler may determine whether to schedule a given workload to be performed by a combination of virtual machines in the first and second portions, or by virtual machines included in only the first portion. The given workload may be scheduled to be performed by virtual machines in only the first portion at a first time if a sum of an anticipated resource consumption level of the given (Continued)

workload and a first consumption level of the first portion of virtual machines at the first time is less than or equals a total amount of resources included in the first portion.

17 Claims, 4 Drawing Sheets

(51) Int. Cl.
  *G06F 9/48* (2006.01)
  *G06F 18/214* (2023.01)
  *G06F 9/54* (2006.01)

(52) U.S. Cl.
  CPC .......... *G06F 9/5038* (2013.01); *G06F 9/5077* (2013.01); *G06F 9/5083* (2013.01); *G06F 9/546* (2013.01); *G06F 18/214* (2023.01); G06F 2009/45583 (2013.01); G06F 2209/503 (2013.01); G06F 2209/504 (2013.01); G06F 2209/5022 (2013.01)

(58) Field of Classification Search
  CPC .......... G06F 9/546; G06F 2009/45583; G06F 2209/5022; G06F 2209/503; G06F 2209/504; G06F 9/5027; G06K 9/6256
  See application file for complete search history.

(56) References Cited

U.S. PATENT DOCUMENTS

| | | | | |
|---|---|---|---|---|
| 10,514,960 | B2* | 12/2019 | Cropper | ............. G06F 9/5083 |
| 2014/0067778 | A1* | 3/2014 | Borthakur | ............. G06F 16/185 |
| | | | | 707/694 |
| 2015/0277987 | A1 | 10/2015 | Di Balsamo et al. | |
| 2017/0220392 | A1 | 8/2017 | Cropper et al. | |
| 2018/0181439 | A1* | 6/2018 | Jackson | ............. G06F 9/5005 |
| 2018/0181896 | A1 | 6/2018 | Abuelsaad et al. | |
| 2020/0301740 | A1* | 9/2020 | Gabrielson | ............. G06F 9/451 |

OTHER PUBLICATIONS

Zhao, CN107527171A Description Translation, Dec. 29, 2017, [database online], [retrieved on Aug. 12, 2022] Retrieved from Espacenet using Internet <URL:https://worldwide.espacenet.com/publicationDetails/description?CC=CN&NR=107527171 A&KC=A&FT=D&ND=3&date=20171229&DB=&locale=en_EP>, pp. 1-18 (Year: 2017).*

International Search Report and Written Opinion for International Application No. PCT/US2019/065684 dated Feb. 27, 2020. 16 pages.

Office Action for Korean Patent Application No. 10-2021-7011710 dated Nov. 11, 2022. 7 pages.

* cited by examiner

| Workload Name | Resources Consumed (Workload) | | Priority | ... |
|---|---|---|---|---|
| | Cores | RAM | | |
| Workload_1 | 20 | 50 | 0.1 hrs | ... |
| Workload_2 | 16 | 32 | 5 hours | ... |
| Workload_3 | 20 | 30 | 15 hours | ... |
| Workload_4 | 50 | 100 | 5 hours | ... |
| ... | | | | |
| Workload_n | 16 | 40 | 0.5 hours | ... |

Fig. 3

SYSTEM FOR COMMITMENT-AWARE WORKLOAD SCHEDULING BASED ON ANTICIPATED RESOURCE CONSUMPTION LEVELS

CROSS-REFERENCE TO RELATED APPLICATIONS

The present application claims the benefit of the filing date of U.S. Provisional Patent Application No. 62/837,755 filed Apr. 24, 2019, the disclosure of which is hereby incorporated herein by reference.

BACKGROUND

Distributed networks offer scalable computing resources to customers. A customer can scale the amount of resources being consumed at any given time depending on the customer's needs. Additionally, customers can call for commitments to computing resources, whereby the resources called for by the customer are dedicated to the costumer, generally at a reduced cost. Such commitments allow the customer to use up to a certain amount of concurrent resources at any time, and any resource usage above that amount is charged at a generally higher rate, such as an on-demand rate.

A customer's needs may include both latency-sensitive and latency-tolerant workloads. In the case of a latency-tolerant workload, it may be disadvantageous to start the workload immediately if the allocated resources the customer called for are already in use and the customer would need to pay for use of additional resources. However, in the case of a latency-sensitive workload, it may be disadvantageous to delay the workload.

BRIEF SUMMARY

A scheduler in a distributed system can determine, for a given workload, whether to schedule the given workload to be performed only by dedicated computing resources in a distributed system or by a combination of both dedicated and non-dedicated computing resources in the distributed system. This determination may balance a cost of carrying out a workload against a time-sensitivity for carrying out the workload, since not all of the resources may be rated equally, and not all workloads may be equally time-sensitive. For instance, the dedicated computing resources may be allocated by the user in advance at a discounted, fixed rate, whereas the non-dedicated computing resources may be available to the user for allocation as needed, but at a non-discounted, on-demand rate. Additionally, some workloads may be latency-sensitive and require immediate or near-immediate attention, whereas other workloads may be latency-tolerant and could be delayed for an amount of time. Scheduling the workloads based on these factors may result in resource and cost savings for the user.

BRIEF DESCRIPTION OF THE DRAWINGS

FIG. 3 is a diagram illustrating example workloads according to aspects of the disclosure.

DETAILED DESCRIPTION

Overview

Figure 1:
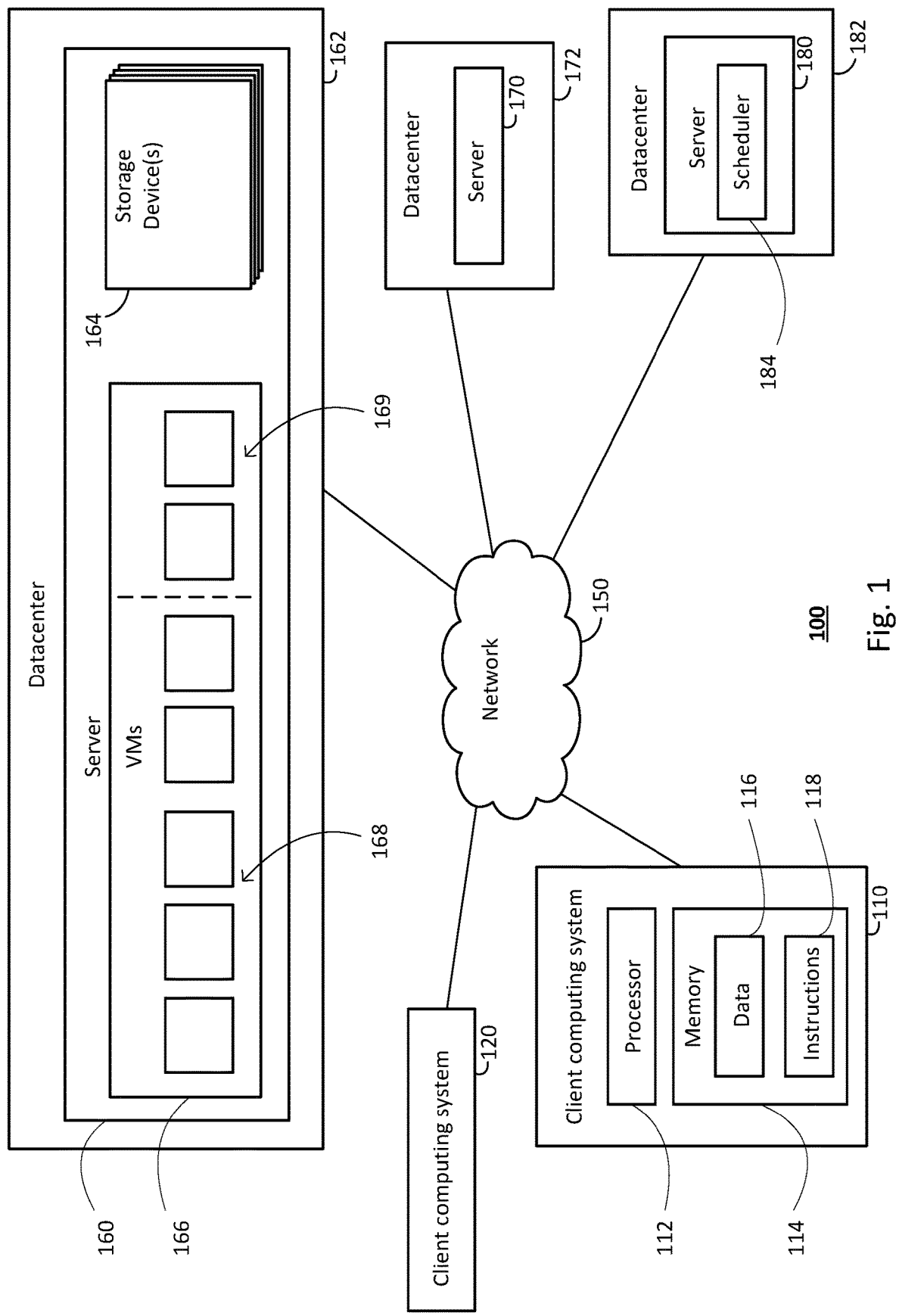
FIG. 1 is a block diagram illustrating an example system according to aspects of the disclosure.

The technology relates generally to a system for scheduling latency tolerant workloads. The system may include a scheduler or scheduling program that takes into account the allocated resources dedicated to a user when scheduling the latency tolerant workloads. The program can also take into account the consumption status of the allocated resources at both current and future times, such as a consumption status at a current time, items scheduled for a later time, and a forecasted consumption status.

In some implementations, the scheduling program can be stored in a distributed network having multiple virtual machines across one or more datacenters.

In one implementation, as the scheduling program receives workload items to be scheduled, the items may be queued in a buffer. Each item may be associated with a particular workload. In some implementations, the size of the workload may be measured in terms of an amount of virtual machine (VM) cores anticipated to be required in order to carry out the workload. In other implementations, the size of the workload may be measured in terms of an amount of random access memory anticipated to be required in order to carry out the workload. In other implementations, both cores and RAM may be taken into account.

In some implementations, each task may further be associated with a priority level. The priority level may indicate whether a given workload is latency-sensitive or latency tolerant, and to what degree. The priority level may be a deadline, such as a start deadline, by when the workload should be performed. For instance, the deadline may indicate an amount of time from when the workload was sent to the scheduler until performing the workload must be started. This can enable the scheduler to minimize consumption of the user's committed resources for latency-tolerant workloads, while ensuring both that latency sensitive workloads are handled appropriately and that the latency-tolerant workloads are timely executed.

In some implementations, if a workload is not scheduled to be performed immediately, it may be scheduled for a later time based on a prediction or forecast of future resource utilization. The forecast may be based on historical usage patterns for the user. The patterns may indicate an upcoming time at which sufficient committed resources are likely—or even most likely—to be available for performing the workload. The workload could then be scheduled to be performed at that upcoming time.

In some cases, when the user's committed resources are always running close to their limit, there may not be any time at which sufficient committed resources will be available to fit the entire workload. In such a case, the scheduler may determine based on the forecast a time at which total resource utilization is likely at a minimum, and then schedule the task for that time.

The above implementations can ensure that usage of the committed resources is maximized, and further that usage of non-committed resources is minimized. This in turn can result in resource and cost savings for the user, since usage of non-committed resources is generally more costly than usage of committed resources.

EXAMPLE SYSTEMS

FIG. 1 is a block diagram illustrating an example system including a distributed database. FIG. 1 illustrates an example system 100. The system 100 includes a distributed network of one or more virtual machines 166, each having a first portion of committed virtual machines 168 dedicated to a user and a second portion of on-demand virtual machines 169. The system may also include a workload scheduler 184 configured to receive workloads 232 associated with the user. The scheduler may determine whether to schedule a given workload to be performed by a combination of virtual machines in the first and second portions, or by virtual machines included in only the first portion. The given workload may be scheduled to be performed by virtual machines in only the first portion at a first time if a sum of an anticipated resource consumption level of the given workload and a first consumption level of the first portion of virtual machines at the first time is less than or equals a total amount of resources included in the first portion.

According to an embodiment, the system 100 includes a distributed database may include a plurality of datacenters 162, 172, 182. Each datacenter may be associated with a respective host or server 160, 170, 180. The servers 160, 170, 180 may communicate with each other, for example, over a network 150. The servers 160, 170, 180 may further communicate with a plurality of client devices, such as client computing systems or clients 110, 120.

Each of clients 110, 120 may include a processor 112 and memory 114. The memory 114 may include any one or combination of data 116 and instructions 118. Data 116 included in the memory 114 may be analyzed or otherwise processed by the processor 110 based on the instructions 118. The clients 110, 120 may communicate the data 116 with the one or more servers 160, 170, 180 over the network 150 by transmitting or receiving operations. While only a few clients are shown, it should be understood that a vast number of client devices may communicate with the distributed database over the network 150.

Each datacenter 162, 172, 182 may include a number of storage devices 164, such as hard drives, random access memory, disks, disk arrays, tape drives, or any other types of storage devices. The datacenters 162, 172, 182 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as cabling, routers, etc. Further, in some examples the datacenters 162, 172, 182 may be virtualized environments.

Each server 160, 170, 180 may include a number of processors. The processors may be utilized as computing resources for workloads received from the clients 110, 120, such as a computing task offloaded by a client to be carried out by the servers. The processors may be virtual machines 166, for which a given workload may be divided among the virtual machines included in various datacenters 162, 172, 182 of the distributed network 100. For illustration purposes, virtual machines 166 are shown in FIG. 1 as being included in datacenter 162, but virtual machines may be distributed among the datacenters. The virtual machines 166 may cumulatively provide an amount of processing power (e.g., an amount of processors or cores) as well as an amount of random access memory for completing various tasks or workloads that are provided to the datacenters 162, 172, 182.

A first portion 168 of the virtual machines 166 of the distributed network 100 may be dedicated to a given user, whereby the first portion 168 of virtual machines may be kept available at all times for completion of workloads received from the client devices of the given user. All or some of the remaining virtual machines 166 may make up a second portion 169 to which the given user may have permission to utilize, but that are not dedicated to the given user. For example, the second portion of virtual machines 169 may be available to the user at an on-demand resource consumption cost, whereas the first portion of virtual machines may be available to the user at a fixed rate resource consumption cost. In such an example, the fixed rate cost may have been pre-paid by the user, and may be discounted as compared to the on-demand cost. The on-demand cost may itself be a fixed amount, or may vary depending on various factors, such as actual or typical server demand and traffic, time of day, remaining bandwidth available, etc.

The datacenters 162, 172, 182 may be positioned a considerable distance from one another. For purposes of the present disclosure, the datacenters may be close enough that a given workload may be spread out across the virtual machines of the datacenters. In this regard, the datacenters may be included in a common zone. In other instances, the datacenters may be spread out across multiple zones within a common region. In yet further instances, the datacenters may be spread out across multiple regions, such as being positioned in various locations around the world.

While only a few servers are shown, it should be understood that any number of servers may be included in the distributed database. Similarly, while each server 160, 170, 180 is shown as being associated with its own datacenter, it should be understood that in other examples the servers may be associated with one or more smaller databases. For example, one database may include multiple servers. Examples of distributed systems are further described in U.S. patent application Ser. No. 13/905,637, which is hereby incorporated by reference herein in its entirety.

The datacenters 162, 172, 182 may further include a scheduler 184 stored in the storage devices. The scheduler 184 may be configured to receive workloads send from the clients 110, 120 over the network, and to schedule the workloads to be performed by the virtual machines 166.

Figure 2:
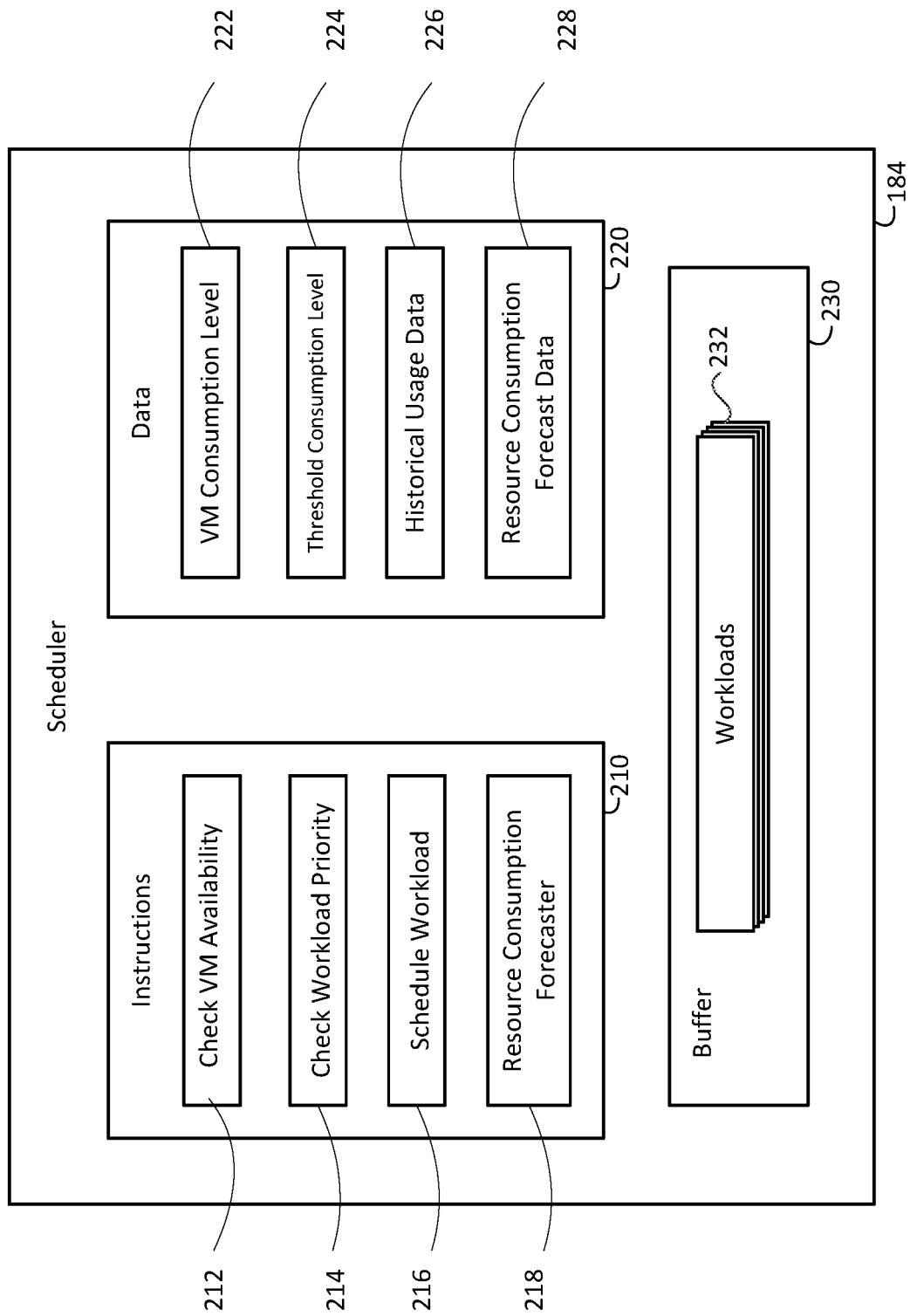
FIG. 2 is another block diagram illustrating a scheduler according to aspects of the disclosure.

FIG. 2 is a block diagram illustrating an example scheduler 184. The scheduler 184 may include a combination of instructions 210 and data 220. The instructions 210 may include operations for facilitating the scheduling of the workloads received from the clients. These operations may be used to determine a time at which the workload will be performed. For instance, for determining whether to perform the workload at a given time, the instructions 210 may include an availability checking operation 212 for determining whether dedicated computing resources (e.g., the first part 168 of the virtual machines 166 of FIG. 1) are available to complete the workload at a given time, and a priority checking operation 214 for determining a time-sensitivity of the workload is within the given time. A workload rescheduling operation 218 may be provided in order to defer scheduling of a workload until a later time. A resource consumption forecasting operation 218 may be included in order to predict an availability of resources at a future time. These and additional operations are described in greater detail in the example methods below.

The data 220 may include various figures and statistics from which the scheduling determinations of the scheduler may be made. Some figures may be fixed values, while other values may vary over time. For instance, the data 220 may include a consumption level 222 of the dedicated computing resources (e.g., the first part 168 of the virtual machines 166 of FIG. 1), a threshold consumption level 224 of the dedicated computing resources, historical usage data 226 indicating consumption levels of the dedicated computing resources over a past span of time, and forecast data 228 indicating a predicted or forecasted consumption level of the dedicated computing resources over a future span of time. These and additional values are described in greater detail in the example methods below.

Additionally, the scheduler 184 may include a buffer 230 for storing workloads 232 received from the clients. The workloads may be queued by the buffer in a first-in-first-out fashion, whereby the workloads may be scheduled by the scheduler in the order that they are received.

FIG. 3 is a diagram illustrating an example buffer 230. In the example of FIG. 3, workloads Workload_1, Workload_2, Workload_3, Workload_4 through Workload_n are shown. Each workload is identified according to a name, and further includes values indicating other properties of the workload, such as a consumption cost and a priority level.

The consumption cost may indicate an anticipated consumption level of the workload, such as how many of the virtual machines are anticipated to be consumed in performing the workload. In some examples, the consumption cost may be a number of cores. In other examples, the consumption cost may be an amount of random access memory. In the example of FIG. 3, the consumption cost indicates each of the number of cores and the amount of random access memory, and each of these values may be taken into account while scheduling the workloads, independently or in combination.

The priority level may be an indication of urgency of a workload. For instance, a first value (corresponding to "urgent") may be assigned to latency-sensitive workloads, whereas a different, second value (corresponding to "not urgent") may be assigned to latency-tolerant workloads. In the example of FIG. 3, the priority level indicates a start deadline, which may be an amount of time for the workload to be started. In this regard, the scheduler may track an amount of time from when the workload is received, and may schedule the workload to be performed at a given time within the amount of time indicated by the priority level.

Example Methods

Figure 4:
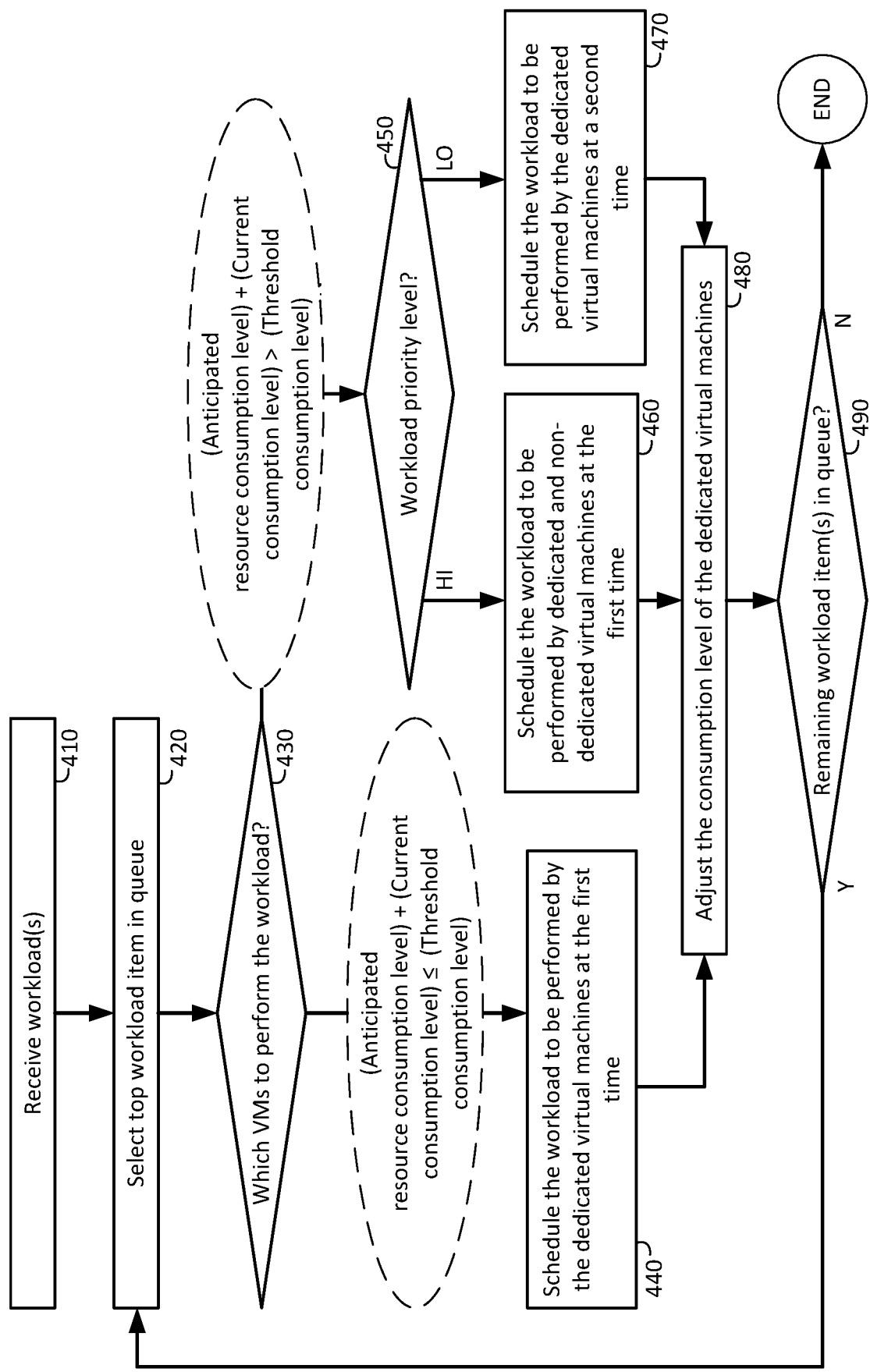
FIG. 4 is a flow diagram illustrating an example method according to aspects of the disclosure.

FIG. 4 is a flow diagram illustrating an example method 400 for scheduling a plurality of workloads received at a scheduler. At block 410, the scheduler receives a plurality of workloads. The workloads may be received over a network of a distributed system from one or more client devices of a given user for whom there exists a number of dedicated virtual machines in the distributed system. The workloads may be ordered in a queue or buffer in an order by which they are received.

At block 420, the scheduler may select a top item in the queue. For example, the scheduler may access the properties of the top item in the queue, such as Workload_1 in the example of FIG. 3.

At block 430, the scheduler may determine whether to schedule the workload to be performed by a combination of dedicated and non-dedicated virtual machines, or by only the dedicated virtual machines. For instance, for a given first time, the determination may be based on whether a sum of the anticipated resource consumption level of the given workload and a first consumption level of the dedicated virtual machines at the first time is less than or equal to a total amount of resources included in the dedicated virtual machines. The first consumption level of the dedicated virtual machines may be tracked by the scheduler as workloads are assigned to the virtual machines.

At block 440, if the sum of the anticipated resource consumption level and the first consumption level at the first time is less than or equal to the total amount of resources included in the dedicated virtual machines, then the scheduler may schedule the workload to be performed by only the dedicated virtual machines at the first time. Stated another way, since there are sufficient resources available at the dedicated virtual machines at the first time, the scheduler may determine to carry out the entire workload using all or a portion of the remaining available dedicated virtual machines, without having to use any of the non-dedicated virtual machines.

Conversely, if the sum of the anticipated resource consumption level and the first consumption level at the first time is greater than the total amount of resources included in the dedicated virtual machines, then the workload scheduler may schedule the workload to be performed by a combination of the dedicated and non-dedicated virtual machines. Stated another way, since there are insufficient resources available at the dedicated virtual machines, the scheduler may determine to carry out part of the workload using the remaining available dedicated virtual machines, and a remaining part of the workload using the non-dedicated virtual machines.

In some examples, scheduling the workload to be performed by a combination of the dedicated and non-dedicated virtual machines may be further determined based on the priority level of the workload. For example, at block 450, the workload scheduler may determine whether to schedule the workload to be performed by only the dedicated virtual machines based on the priority level. For instance, if the priority level is an indication of the workload being urgent, or if the priority level is a start deadline indicating by when the workload must be started and the first time is at or after the start deadline, then at block 460, the scheduler may schedule the workload to be performed at the first time by the combination of dedicated and non-dedicated virtual machines. Conversely, if the if the priority level is an indication of the workload not being urgent, or if the priority level is a start deadline by which the workload must be started and the first time is before the start deadline, then at block 470, the scheduler may schedule the workload to be performed at a different, second time that is later than the first time. At the second time, the workload may be performed by dedicated virtual machines only.

Scheduling a workload for a second time may involve determining a time at which sufficient dedicated resources are available. In order to make such a determination, the scheduler may receive a resource consumption forecast. The resource consumption forecast may indicate anticipated resource consumption levels of the dedicated virtual machines at various times in the future. The scheduler may then select a time in the future with sufficiently low anticipated resource consumption levels (e.g., such that the consumption level of the workload when added to the anticipated resource consumption level is less than or equal to the total amount of resources included in the dedicated virtual machines). In some examples, the scheduler may select a time having a lowest anticipated resource consumption level among the possible options included in the forecast.

At block 480, the scheduler may adjust the consumption level of the dedicated virtual machines based on the prior determinations. For instance, if all or a portion of the workload was scheduled to be carried out at the first time by the dedicated virtual machines, the workload scheduler may add the portion of the workload assigned to the dedicated virtual machines to the first consumption level. Similarly, if the workload was scheduled to be performed at the second time, then the scheduler may add the portion of the workload assigned to the dedicated virtual machines at the second time to a second consumption level of the dedicated virtual machines at the second time. Stated another way, after the workload has been scheduled, the scheduler may update the system to indicate a remaining availability of the dedicated virtual machines to account for a consumption taken up by the scheduled workload.

At block 490, the scheduler may check the queue to determine whether there are any remaining, unscheduled workloads. If no workloads remain in the queue, the method may end. If one or more workloads remain in the queue, operations may revert to block 420, and the next workload in the queue may be selected for scheduling. The scheduling procedure may repeat for every workload in the queue until all items have been scheduled.

In the above example of FIG. 4, the scheduler schedules each workload immediately, before proceeding to the next workload. However, in another example, if the scheduler does not schedule the workload to be performed at the first time, then the scheduler may instead determine to defer scheduling the workload until a later time. Deferring the scheduling of latency-tolerant workloads may be beneficial, since it frees up the limited dedicated resources to be assigned to more time-sensitive workloads in the immediate future (when the dedicated resources are relatively limited) while deferring the less time-sensitive workloads until a later time (when the dedicated resources are less limited by comparison). If the scheduling is deferred until a later time, then at that later time, the operations of blocks 430-480 may be applied to the deferred workload to determine whether to schedule at the deferred time.

Also, in the above example of FIG. 4, the scheduler is described as first determining whether sufficient resources are available to begin a workload before considering the priority level of the workload. However, in other example methods, the scheduler may first determine the priority level of the workload, and then determine whether to schedule the workload for the first time depending on an availability of dedicated virtual machines. For instance, if the first time is a current time, it may be preferable to avoid scheduling latency-tolerant workloads to be performed immediately in case more latency-sensitive workloads are waiting in the queue to be scheduled. Thus, currently available resources of the dedicated virtual machines may be reserved for urgent workloads that will be received shortly or have been received but have not yet been scheduled.

With reference to the aforementioned resource consumption forecast, the forecast may be based on historical usage data. The historical usage data may indicate consumption levels of the dedicated computing resources at various past times. For instance, the historical usage data may indicate resource consumption at a given time of day, a given day of the week, a given day of the year, or any combination of the above. These past indications may be used to predict what resource consumption of the dedicated virtual machines may be at a comparable time in the future. For instance, the historical usage data for dedicated virtual machines in a given region or zone (e.g., central United States, a zone in Eastern Europe) may indicate a relatively low resource consumption during overnight hours at that region or zone. For further instance, the historical usage data may indicate low resource consumption during weekends. These indications may be useful in forecasting that the dedicated virtual machines will be available during future overnight hours or during future weekends.

In one example, forecasting based on historical usage data may be performed using a deterministic algorithm, such as calculating a mean, median or mode of resource consumption for a given time (e.g., time of day, day of the week, etc.). In another example, the forecasting may be performed using a machine learning model. The machine learning model may be taught using training data, such as historical usage data. Additionally, or alternatively, the machine learning model may be dynamically trained, whereby as new resource consumption data becomes available, the machine learning algorithm can itself be updated based on the new resource consumption data in order to improve future forecasts of resource availability. In this regard, the machine learning model may be included in the distributed system, and may be accessed by the scheduler in order to make informed forecasting and scheduling determinations. In the above examples, the machine learning model may be a form of supervised or reinforced learning algorithm, such as a regression algorithm, Markov decision process, neural network, etc.

In some instances, the resource consumption forecast may not indicate any time during which a given workload can be completed by dedicated computing resources, such as if the workload requires more resources than for which the user has prepaid. In such a case, the scheduler may still use the forecast to determine an optimal time when the workload may be started, such as a time when a greatest amount of dedicated resources is anticipated to be available.

To illustrate the example method of FIG. 4, consider a user that has prepaid for 1000 cores and 1000 GB of RAM in a distributed system. The user may be an individual or a corporation. In either case, the user may be associated with a plurality of client devices, whereby the dedicated cores and RAM for which the user has prepaid may be used to complete workloads received from any of the user's client devices.

A plurality of workloads from the user's client devices may be stored in the scheduler buffer, and scheduled in a first-in-first-out order. For sake of example, if 500 cores and 700 GB of RAM are not being used at a first time (e.g., the first time being a time that the workloads are received), and if a first workload in the buffer requires 250 cores and 250 GB of RAM, then the first workload may be scheduled for the first time. The indication of available resources may be updated to account for the scheduled first workload, now that only 250 cores and 450 GB of RAM are now not being used. If a second workload in the buffer requires 250 cores and 500 GB of RAM, then the scheduler may determine that not enough memory remains in the dedicated resources in order for the workload to be performed without purchasing on-demand resources. If the second workload is indicated as having a low priority level, then the scheduler may schedule the workload to be performed at a later time, such as overnight. If a third workload in the buffer requires 400 cores and 450 GB of RAM, then the scheduler may determine that not enough processors are available in the dedicated resources in order for the workload to be performed without purchasing on-demand resources. However, if the third workload is indicated as having a high priority level, then the scheduler may nonetheless schedule the workload to be performed at a current time, whereby at least a portion of the workload is performed by on-demand cores included in the virtual machines.

Upon scheduling of the third workload, the user's dedicated resources may be completely in use. The scheduler may be configured to update the consumption level data of the resources on a regular basis (e.g., pulling resource consumption data, resource consumption data being pushed to the scheduler). For instance, when a workload is completed, the scheduler may be capable of subtracting the overhead of the finished workload from the current consumption level, such that future workloads that are scheduled may be scheduled to be performed by the recently freed-up dedicated resources.

The above example presumes that a user has both prepaid processors and memory. However, in other examples, the user may have prepaid for only one of processors or memory, and the scheduler may take only the prepaid feature into account in determining whether sufficient dedicated resources are available.

While the user's resources are fully used, latency-tolerant workloads that are received by the scheduler may be scheduled for later times, and latency-sensitive workloads may be scheduled to be performed immediately. For example, a user may set a budget for resources to be spent or costs to be incurred by processing workloads in a given day. When the budget has been met or exceeded, a workload to shut off the virtual machines may sent to the scheduler. The workload may be highly latency-sensitive. Thus, even if all of the dedicated resources are tied up when the workload is received, the scheduler may determine to schedule the workload to be carried out immediately by on-demand resources One example benefit of the above described example systems and methods can be found in the case of coworkers scheduling batch processes to be completed. Each of the coworkers may wish to access the same dedicated virtual machines, and the batch processes may be latency-tolerant. As such, the scheduler may schedule each of the batch processes to be carried out by the dedicated virtual machines overnight, as opposed to during business hours. What's more, whereas the client devices of the coworkers may have scheduled each of these processes to be carried out by the dedicated virtual machines at the same time (e.g., at midnight). This would have resulted in some of the processes being carried out by the dedicated virtual machines, and the remaining processes being carried out by non-dedicated, on-demand virtual machines. By contrast, the scheduler is capable of spreading the batch processes out over a span of time. For instance, the first process received at the scheduler may be scheduled for midnight, and if the available resources are taken up by the first process, then the next process received by the scheduler may be scheduled for a later time such as 2 a.m. The remaining processes may be likewise scheduled by the scheduler in accordance with the systems and methods described above.

The above example systems and methods may be useful for ensuring that a user's most latency-sensitive workloads are handled promptly while at the same time managing the user's resource costs.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
    a distributed network of a plurality of virtual machines, the plurality of virtual machines comprising:
        a first portion of committed virtual machines dedicated to a user; and
        a second portion of on-demand virtual machines; and
    a workload scheduler configured to:
        receive a plurality of workloads associated with the user, each given workload to be performed by one or more of the plurality of virtual machines, each given workload including an anticipated resource consumption level indicating how many of the plurality of virtual machines are expected to be used to perform the given workload;
        queue the plurality of workloads in a queue according to an order in which the plurality of workloads are received; and
        for each given workload in the queue according to an order of the queue:
            determine whether to schedule the given workload to be performed by a combination of virtual machines included in the first and second portions of virtual machines, or by virtual machines included in only the first portion of virtual machines; and
            schedule the given workload to be performed at a scheduled time by one or more of the plurality of virtual machines according to the determination, and
            execute the given workload at the scheduled time, and
    wherein the workload scheduler is configured to determine to schedule the given workload to be performed by virtual machines included in only the first portion of virtual machines at a first time if a sum of (i) an anticipated resource consumption level of the given workload and (ii) a first consumption level of the first portion of virtual machines at the first time is less than or equal to a total amount of resources included in the first portion of virtual machines, and
    wherein the workload scheduler is further configured to automatically schedule the given workload to be performed by a combination of virtual machines included in the first and second portions of the plurality of virtual machines at a time that the anticipated resource consumption level of the first portion of virtual machines is forecast to be at a minimum according to a resource consumption forecast in response to a sum of the anticipated resource consumption level of the given workload and the anticipated resource consumption level of the first portion of virtual machines being greater than the total amount of resources included in the first portion of virtual machines at all times of the resource consumption forecast.

2. The system of claim 1, wherein if the sum of the anticipated resource consumption level of the given workload and the first consumption level of the first portion of virtual machines at the first time is greater than the total amount of resources included in the first portion of virtual machines, the workload scheduler is further configured to schedule the given workload to be performed by a combination of virtual machines included in the first and second portions of virtual machines.

3. The system of claim 1, wherein if the given workload is scheduled to be performed by virtual machines included in only the first portion of virtual machines at the first time, the workload scheduler is further configured to add the anticipated resource consumption level of the given workload to the first consumption level.

4. The system of claim 1, wherein each workload further indicates a priority level for performing the given workload, and wherein if the sum of the anticipated resource consumption level of the given workload and the first consumption level of the first portion of virtual machines at the first time is greater than the total amount of resources included in the first portion of virtual machines, the workload scheduler is configured to determine whether to schedule the given workload to be performed by virtual machines included in only the first portion of virtual machines at the first time based on the priority level.

5. The system of claim 4, wherein the priority level is a deadline, and wherein the workload scheduler is configured to: determine whether the first time is at or after the deadline; and if the first time is at or after the deadline, schedule the given workload to be performed at the first time by a combination of virtual machines included in the first and second portions of virtual machines.

6. The system of claim 4, wherein, if the priority level of the given workload indicates that the given workload is a latency-sensitive workload and the sum of the anticipated resource consumption level of the given workload and the first consumption level of the first portion of virtual machines at the first time is greater than the total amount of resources included in the first portion of virtual machines, the workload scheduler is configured to schedule the given workload to schedule the given workload to be performed by the combination of virtual machines included in the first and second portions of virtual machines at the first time.

7. The system of claim 6, wherein, if the priority level of the given workload indicates that the given workload is a latency-tolerant workload and the sum of the anticipated resource consumption level of the given workload and the first consumption level of the first portion of virtual machines at the first time is greater than the total amount of resources included in the first portion of virtual machines, the workload scheduler is further configured to repeatedly defer scheduling the given workload until a time that the sum of the anticipated resource consumption level of the given workload and the first consumption level of the first portion of virtual machines is less than or equal to the total amount of resources included in the first portion of virtual machines or the priority level of the given workload indicates that the given workload is a latency-sensitive workload.

8. The system of claim 1, wherein if the sum of the anticipated resource consumption level of the given workload and the first consumption level of the first portion of virtual machines at the first time is greater than the total amount of resources included in the first portion of virtual machines, the workload scheduler is further configured to, at the first time, schedule the given workload to be performed at a second time after the first time if a sum of (i) the anticipated resource consumption level of the given workload and (ii) an anticipated resource consumption level of the first portion of virtual machines at the second time is less than or equal to the total amount of resources included in the first portion of virtual machines.

9. The system of claim 8, wherein the workload scheduler is further configured to add the anticipated resource consumption level of the given workload to the anticipated resource consumption level of the first portion of virtual machines at the second time.

10. The system of claim 8, wherein the workload scheduler is further configured to schedule the given workload to be performed at the second time based at least on the resource consumption forecast indicating the anticipated resource consumption level of the first portion of virtual machines to be at a minimum at the second time.

11. The system of claim 10, wherein the workload scheduler is further configured to reschedule the given workload from the second time to a third time in response to an indication of the resource consumption forecast being updated, wherein the updated resource consumption forecast indicates an anticipated resource consumption level of the first portion of virtual machines to be at a minimum at the third time.

12. The system of claim 1, wherein the workload scheduler is further configured to execute the resource consumption forecast based on historical usage data.

13. The system of claim 1, wherein the resource consumption forecast is a dynamically trained model.

14. The system of claim 1, wherein the anticipated resource consumption level of the given workload is an amount of cores required to run the given workload, the first consumption level is an amount of cores of the first portion of virtual machines in use at the first time, and the total amount of resources included in the first portion of virtual machines is a total amount of cores included in the first portion of virtual machines.

15. The system of claim 1, wherein the anticipated resource consumption level of the given workload is an amount of memory required to run the given workload, the first consumption level is an amount of memory of the first portion of virtual machines in use at the first time, and the total amount of resources included in the first portion of virtual machines is a total amount of memory included in the first portion of virtual machines.

16. The system of claim 1, wherein the workload scheduler is further configured to determine, for the given workload, whether to schedule the given workload to be performed at the first time based both a total amount of cores and a total amount of memory available at the first time in the first portion of virtual machines.

17. The system of claim 1, wherein, for the user, a resource consumption cost of the first portion of virtual machines is less than a resource consumption cost of the second portion of virtual machines.

* * * * *